United States Patent
Otschik et al.

(10) Patent No.: US 11,028,926 B2
(45) Date of Patent: Jun. 8, 2021

(54) MECHANICAL SEAL ARRANGEMENT WITH MINIMAL LEAKAGE

(71) Applicant: EagleBurgmann Germany GmbH & Co. KG, Wolfratshausen (DE)

(72) Inventors: Joachim Otschik, Beuerberg (DE); Andreas Schrufer, Wolfratshausen (DE); Jorg Thomas Thelke, Wolfratshausen (DE); Rudolf Schicktanz, Geretsreid (DE); Christine Labatut-Stolle, Wolfratshausen (DE); Aleksandar Simic, Penzberg (DE); Joachim Reitberger, Wolfratshausen (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 110 days.

(21) Appl. No.: 16/464,043

(22) PCT Filed: Sep. 26, 2017

(86) PCT No.: PCT/EP2017/074343
§ 371 (c)(1),
(2) Date: May 24, 2019

(87) PCT Pub. No.: WO2018/099627
PCT Pub. Date: Jun. 7, 2018

(65) Prior Publication Data
US 2019/0383397 A1    Dec. 19, 2019

(30) Foreign Application Priority Data
Nov. 29, 2016  (DE) .................... 10 2016 223 636.9

(51) Int. Cl.
*F16J 15/34*    (2006.01)

(52) U.S. Cl.
CPC .................... *F16J 15/3496* (2013.01)

(58) Field of Classification Search
CPC ...... F16J 15/3496; F16J 15/34; F16J 15/3404; F16J 15/3408; F16J 15/3416;
(Continued)

(56) References Cited

U.S. PATENT DOCUMENTS 3,729,204 A * 4/1973 Augustin ............... F16J 15/324
277/559
4,335,888 A * 6/1982 Ohba ................... F16J 15/3468
277/306
(Continued)

FOREIGN PATENT DOCUMENTS

CN    103097574 A    5/2013
CN    105723133 A    6/2016
(Continued)

OTHER PUBLICATIONS

Chinese Office Action dated Dec. 13, 2019, and English translation thereof, issued during the prosecution of Chinese Patent Publication No. 201780073692.
(Continued)

*Primary Examiner* — Nathan Cumar
(74) *Attorney, Agent, or Firm* — Locke Lord LLP; Scott D. Wofsy

(57) ABSTRACT

The invention relates to a mechanical seal assembly comprising a mechanical seal with a rotating slide ring and a stationary slide ring, wherein one of the two slide rings has a first slide surface, wherein the other of the two slide rings has a second slide surface with a circumferentially closed sealing blade which protrudes from a bottom region of the second slide surface in the direction of the first slide surface by a height (H), wherein the sealing blade has a width (B) in a range of between 10 and 500 μm, wherein at least one
(Continued)

Figure 1:
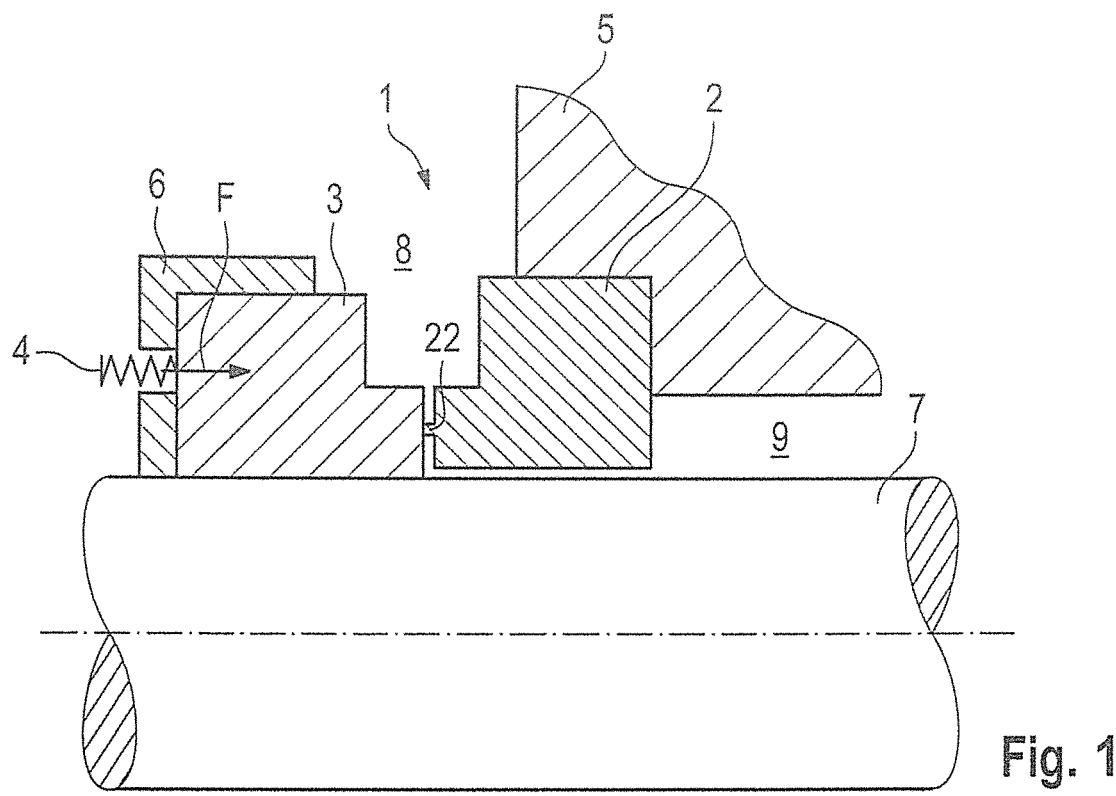

pre-tensioning element braces the slide rings against each other, wherein the second slide surface and the sealing blade on the second slide surface have a diamond coating.

19 Claims, 7 Drawing Sheets

(58) Field of Classification Search
CPC ........ F16J 15/344; F16J 15/3452; F16J 15/00; F16J 15/16; F16J 15/50; F16J 15/52; F16J 15/162; F16J 15/324; F16J 15/40
USPC ........................................................ 277/382
See application file for complete search history.

(56) References Cited

U.S. PATENT DOCUMENTS

| | | | |
|---|---|---|---|
| 6,325,380 B1 * | 12/2001 | Feigl | F01D 25/168 277/352 |
| 6,494,462 B2 * | 12/2002 | Dietle | F16J 15/162 277/549 |
| 2002/0163138 A1 * | 11/2002 | Dietle | F16J 15/3244 277/559 |
| 2013/0168928 A1 * | 7/2013 | Schrufer | C10M 103/02 277/500 |
| 2016/0053895 A1 * | 2/2016 | Otschik | F16J 15/162 277/405 |

FOREIGN PATENT DOCUMENTS

| | | |
|---|---|---|
| DE | 202006006425 U1 | 6/2006 |
| DE | 10 2014 203569 B3 | 2/2015 |
| WO | 2014/161704 A1 | 10/2014 |

OTHER PUBLICATIONS

International Search Report issued in correspoding PCT Patent Application No. PCT/EP2017/074343, dated Jan. 12, 2018.

* cited by examiner

MECHANICAL SEAL ARRANGEMENT WITH MINIMAL LEAKAGE

CROSS REFERENCE TO RELATED APPLICATIONS

This application is a 35 U.S.C. § 371 National Phase Application of International PCT Patent Application No. PCT/EP2017/074343, filed on Sep. 26, 2017, which claims the benefit of priority to German Patent Application No. 10 2016 223 636.9, filed on Nov. 29, 2016. The entire contents of these applications are incorporated herein by reference in their entireties.

The invention relates to a mechanical seal arrangement with a minimal leakage, wherein the mechanical seal arrangement is almost leak-proof and at most has an atomic leakage.

Mechanical seals are known from the state of the art in different embodiments. Usually, a mechanical seal comprises a rotating slide ring and a stationary slide ring which define a sealing gap in between them. Usually, a lubricant is arranged in the sealing gap, which can be in gaseous or liquid form. As a result, on principle there is always a certain leakage through the sealing gap. Thus, to prevent a product to be sealed from reaching the environment, the pressure conditions are often such that an external pressure is chosen to be higher than the pressure of the product, so that the leakage passes in the direction of the product. Alternatively, also so-called tandem arrangements are known in which two mechanical seals are switched in series. A barrier fluid is inserted between the mechanical seals that are switched in series. Here, a leakage to the environment can be prevented by means of different measures also if the product pressure is higher than the barrier fluid pressure. However, this respectively entails high mounting and investment costs. In addition, in many applications there is often not sufficient axial installation space for arranging tandem seals.

Thus, it is the objective of the present invention to provide a mechanical seal arrangement which facilitates a reliable sealing while also being characterized by a simple structure and an easy, cost-effective manufacturability, and that still has only a minimal leakage while showing low wear to the sliding surfaces and having a long service life of the mechanical seal arrangement.

This objective is achieved through a mechanical seal arrangement with the features of claim 1. The subclaims show preferred further developments of the invention.

For the first time in the technical field of mechanical seals, it is made possible by the mechanical seal arrangement according to the invention with the features of claim 1 that practically no leakage occurs occurring operation. What maximally occurs is an atomic leakage, i.e. individual atoms of a lubricant between the slide rings or a product to be sealed which is used as a lubricant occur as a leakage. Thus, for the first time, almost leak-proof mechanical seals are possible. Since practically no leakage occurs during operation, otherwise customary auxiliary appliances of mechanical seal arrangements, such as for example lubricant equipment or a second mechanical seal for backup, can be omitted. The mechanical seal arrangement according to the field of the invention thus for the first time offers a real alternative to so-called magnet couplings which facilitate a fluid-tight separation. A further great advantage of the mechanical seal arrangement according to the invention is the fact that practically no heat is generated during operation. In this manner, appliances for cooling the slide rings can be omitted. Further, also a practically wear-free operation of the slide ring is possible. These surprising and unusual advantages of slide ring seals which otherwise on principle always have a leakage due to the sealing gap, are achieved by one of the two slide rings having a flat first sliding surface and the other of the two slide rings having a second sliding surface, which has a circumferentially close sealing edge that projects from a base area of the second sliding surface in the direction towards the first sliding surface. The sealing edge forms a kind of sealing dam, and has a width on the basal surface that is in a range of 10 to 500 µm. Due to the extremely small width, the term "sealing edge" was used. Further, at least one pre-stressing element, in particular a spring element or the like, is provided, which pre-stresses the two slide rings against each other. The second sliding surface further has a diamond coating, wherein the sealing edge is completely made of diamond at the second sliding surface. Alternatively, the second sliding surface has a coating of cubic boron nitride, and the sealing edge is completely made of cubic boron nitride. Preferably, the two sliding surfaces are made of the same material. Further, a fluid is present between the sliding surfaces, which is configured for releasing OH− ions or H+ ions.

Thus, a stable frictional state with extremely small friction coefficients in the range of less than 0.02 is created under the above-described conditions between the sealing edge and the flat sliding surface at the other slide ring. If a pre-stress is present, the presence von OH− ions or H+ ions partially causes a contact friction between the sealing edge and the plane of the other sliding surface during operation. In this manner, a distance between the sealing edge and the flat other sliding surface in the range of a few Å, in particular of between 2 to 7 Å is possible. Thus, a mechanical seal arrangement is provided which does not have any typical sealing gaps, but rather provides a kind of contact fit between the sealing edge and the flat other sliding surface trough a pre-stressing force, wherein a stable frictional state with a minimum friction coefficient which is practically leakage-free can be achieved due to the presence of OH− ions and/or H+ ions. This works only in the interaction with the small width of the sealing edge as well as the OH− ion donor or H+ ion donor close to the sealing edge. By using the diamond or cubic boron nitride for the sealing edge, the latter is very robust and designed for a long service life despite the minimum width. Here, it is completely surprising that the sealing edge does not have the effect of a blade edge due to its extremely small width, and does not cut into the opposite flat first sliding surface.

The width of the sealing edge is preferably smaller than or equal to 60 µm, and particularly preferably is in a range of 40 µm to 60 µm. It has been shown that in this range a particularly leak-proof mechanical seal arrangement can be achieved.

It is further preferred if the first sliding surface, which is designed to be flat, is provided in such a manner that the first sliding surface has a medium roughness Ra in a range of smaller than or equal to 0.2 µm, preferably smaller than or equal to 0.1 µm. During operation, through a polishing effect, it is possible to achieve roughnesses as a result of short-term contact between the sealing edge and the flat sliding surface that are smaller than 0.1 µm.

It is particularly preferable if a load factor k (k factor), which is a ratio of a pressure-loaded surface between the sliding surfaces and the size of the opposite surface between the two sliding surfaces, is in a range of 0 to 0.3. Due to this very small load factor k, a simple design of model ranges and mechanical seal arrangements is possible, since only the contact pressure created by the pre-stress determines the maximal pressure to be sealed.

It is further preferred if the flat first sliding surface has a circular flatness that is smaller than or equal to 5 µm. The flatter the flat first sliding surface, the smaller the subsequent leakage, even if it is only in the atomic range.

It is further preferred if the flat first sliding surface has a diamond coating or a coating of cubic boron nitride. Pairings in which the first and second sliding surface respectively has a diamond coating or the first and the second sliding surface respectively has a coating of cubic boron nitride are particularly preferable here. This yields the best results with respect to leak-proofing and service life of the mechanical seal arrangement.

It is particularly preferable if a geometric shape of the sealing edge is circular. Such a sealing edge can be produced in a relatively simple and cost-effective manner, wherein an inner diameter and an outer diameter of the sealing edge remains constant along the circumference.

Alternatively, a geometric shape of the sealing edge is wave-shaped and in particular sine-shaped. In this manner, a meander-shaped sealing edge is obtained which in total has a longer sealing line than the circular sealing edge.

In a further alternative, the geometric shape of the sealing edge is approximately crenellation-shaped, with radially projecting areas and radially retracted areas. This results in pockets at the radially outer side and the radially inner side of the sealing edge. Preferably, the lengths of the pockets in the circumferential direction are constant. However, it is particularly preferable if the pockets in the circumferential direction have different lengths. Here, that pocket which is directed towards the product to be sealed is preferably provided with a longer circumferential length. The opposite pocket is provided with a smaller circumferential length.

A further preferred alternative of the invention is that the sealing edge has a varying width in the radial direction. The width is preferably provided in such a manner that a regular varying width is provided. In this manner, in particular a supply with $OH^-$ ions and/or $H+$ ions can be improved. A particularly good stability and sealing is achieved if the sealing edge has a ratio of a height to a width of the sealing edge that is in a range of 0.002 to 2, preferably 0.5 to 1.5.

It is further preferred if the second sliding surface at which the sealing edge is arranged additionally has support structures at a basal surface of the second sliding surface. The support structures are preferably provided exclusively at the base side of the second sliding surface that is directed towards the product to be sealed. The support structures are preferably made of the same material as the sealing edge. The support structures can be individually arranged on the total surface, or the support structures are connected to the sealing edge.

To facilitate a redundancy of the sealing, the mechanical seal arrangement according to the invention further preferably has a second sealing edge. The second sealing edge preferably has a lesser height than the first sealing edge. Here, the second sealing edge can have the same geometric shape as the first sealing edge, or can also have a different geometric shape. The second sealing edge is also formed at the second sliding surface.

Preferably, the donor medium which provides the OH– ions and/or the H+ ions is liquid or gaseous or is a gas-liquid mixture. Particularly preferably water is provided as the OH– ion donor and/or the H+ ion donor. Here, it is possible to use pure water or water as a part of a mixture.

The sealing edge preferably has a height of less than or equal to 20 µm.

It is further preferred if the width of the sealing edge varies between 30 µm and 60 µm.

Further, the second sliding surface has a first and a second tapering area as well as a flat area. The flat area is arranged between the two tapering areas. The two tapering areas adjoin the inner circumference or the outer circumference of the slide ring. The sealing edge is provided at the flat area of the second sliding surface. Thus, through the tapering areas, larger spaces result at the inner circumference and at the outer circumference of the slide ring, in which fluid is present, so that during operation a reduced shear force is present in the fluids, and thus a reduced inner friction in the fluids in the area of the inner and the outer circumference of the slide rings.

It is particularly preferable if the other of the two slide rings also has a structure with a first and a second tapering area as well as a flat area that is arranged in between them and located opposite the sealing edge. In this manner, respectively two tapering areas are located opposite other at the slide rings, so that the space becomes larger at the tapering areas in the radial direction of the slide rings inwards and outwards, and only the medium area provides the actual sliding surfaces. In this manner, the shearing resistance in the inner and the outer circumferential areas of the slide rings can be significantly reduced.

A first and second width of the first and second tapering areas preferably has the same width as a third width of the flat area arranged between the tapering areas. Thus, at the sliding surface, each of the three areas has a third of the total width of the slide ring in the radial direction. It is further preferred if the sealing edge is arranged centrally on the flat area.

Figure 2:
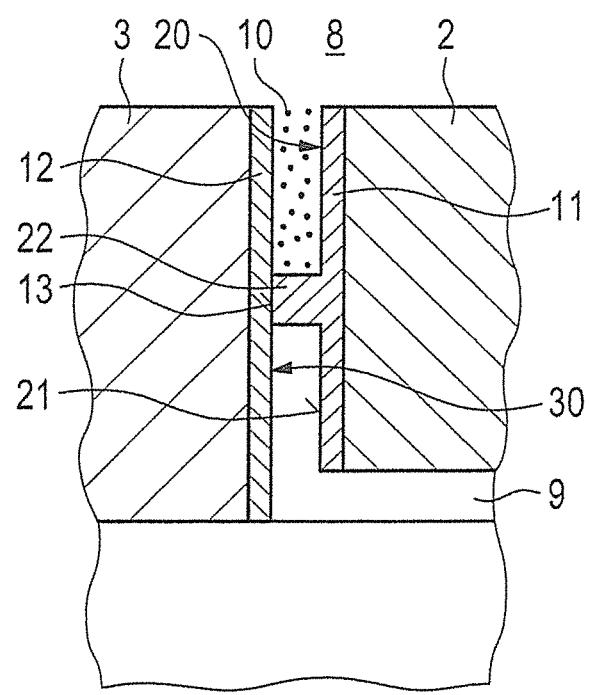
Figure 3:
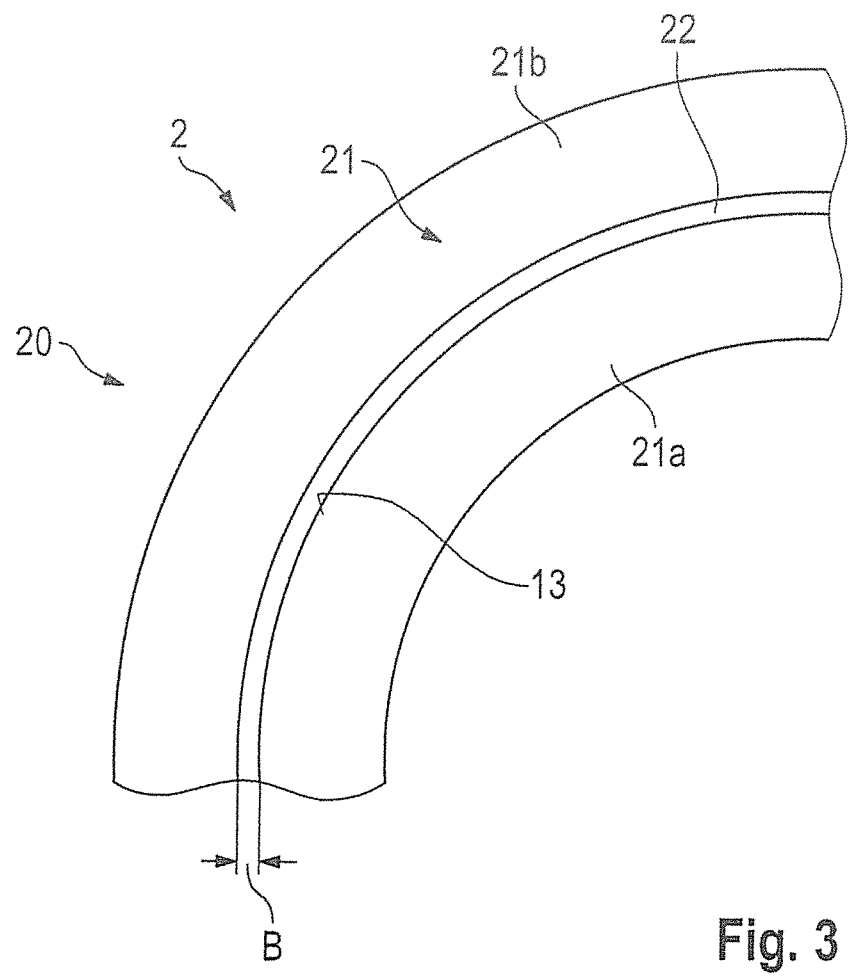
Figure 4:
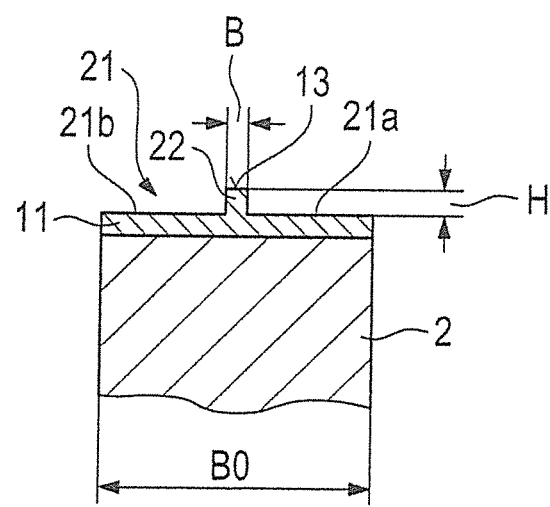
Figure 5:
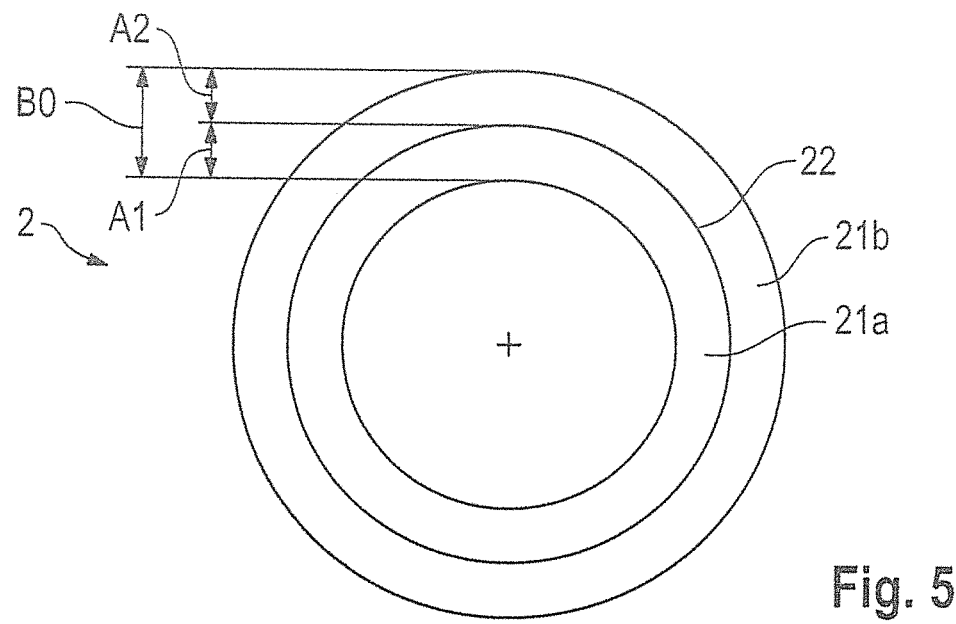
Figure 6:
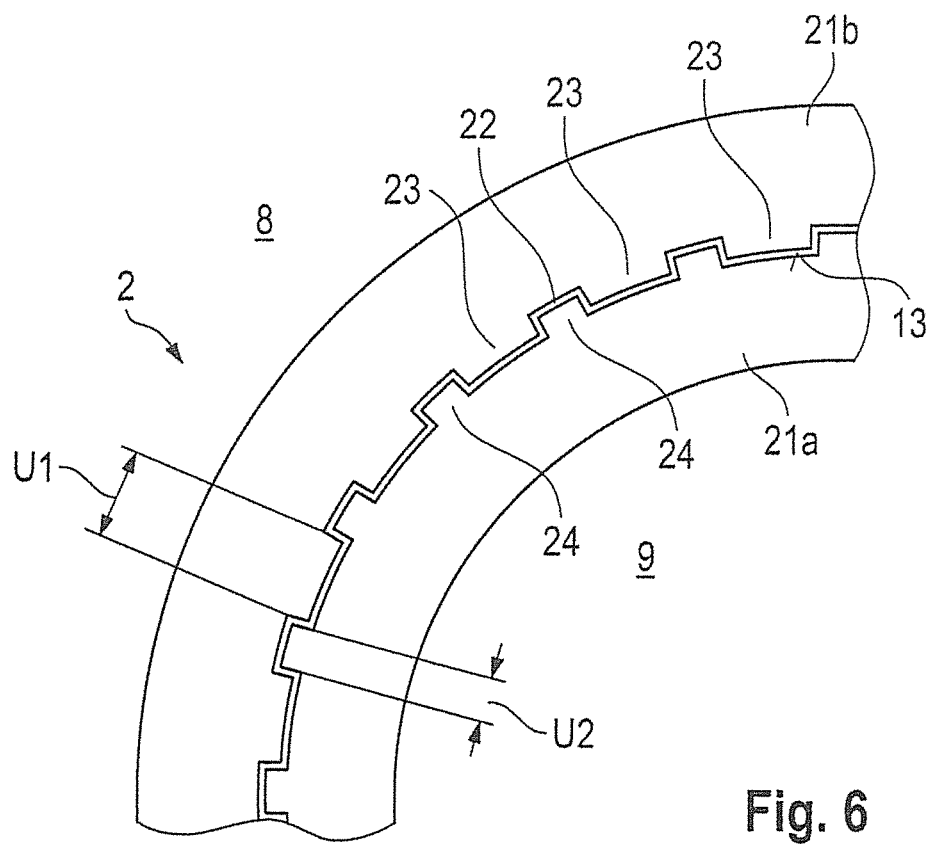
Figure 7:
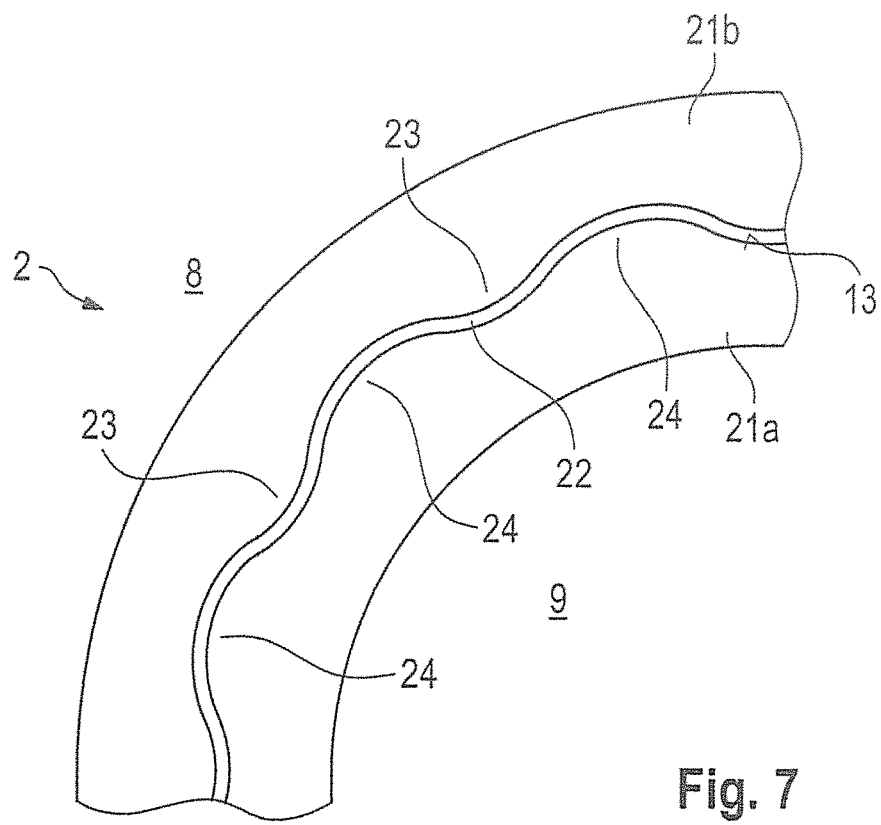
Figure 8:
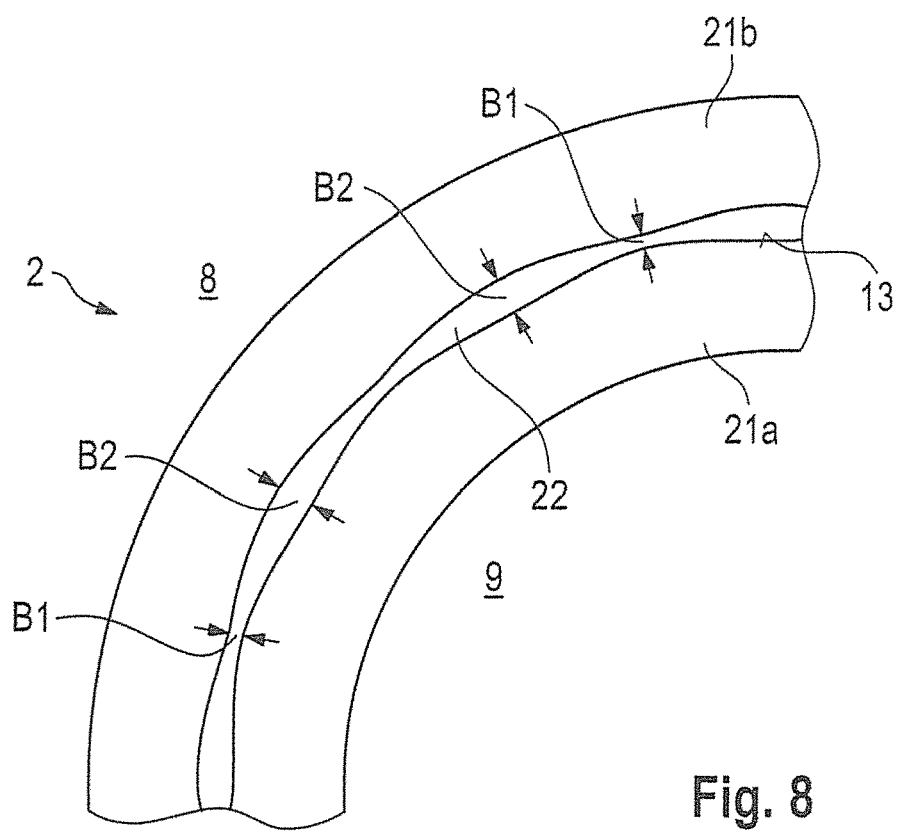
Figure 9:
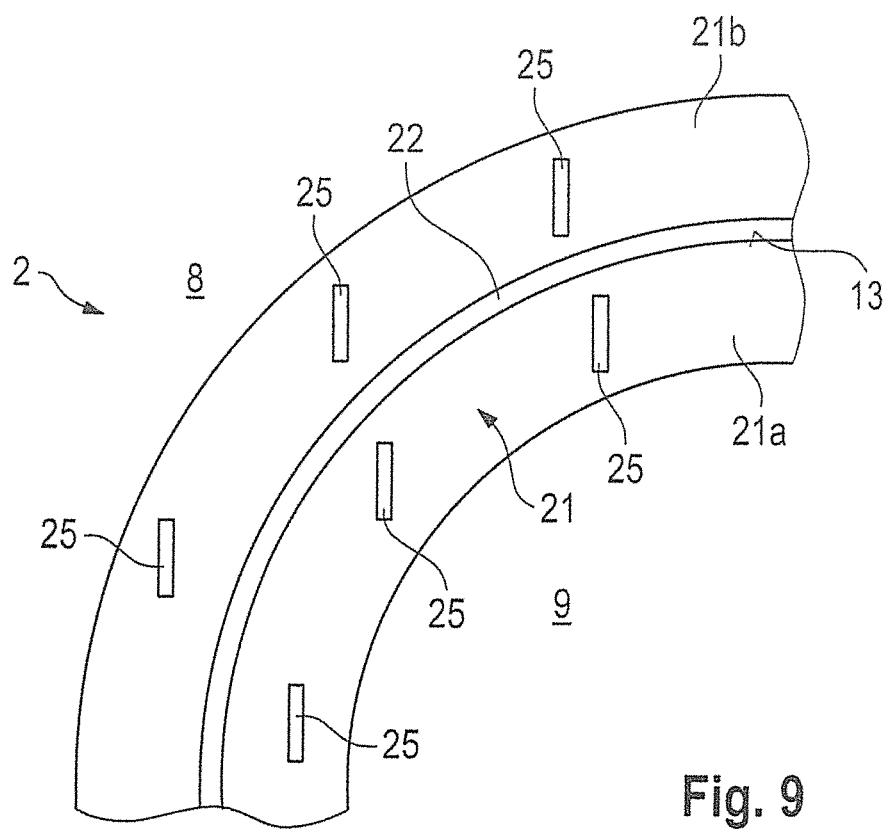
Figure 10:
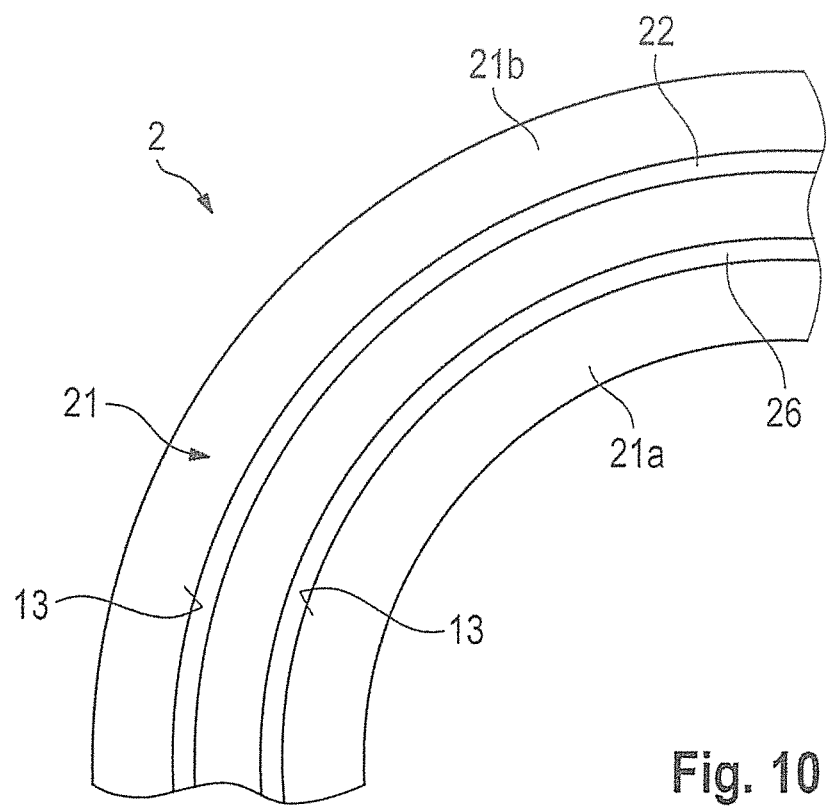
Figure 11:
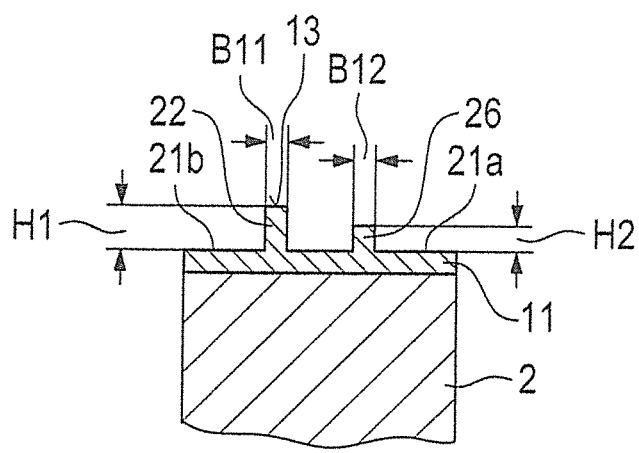
Figure 12:
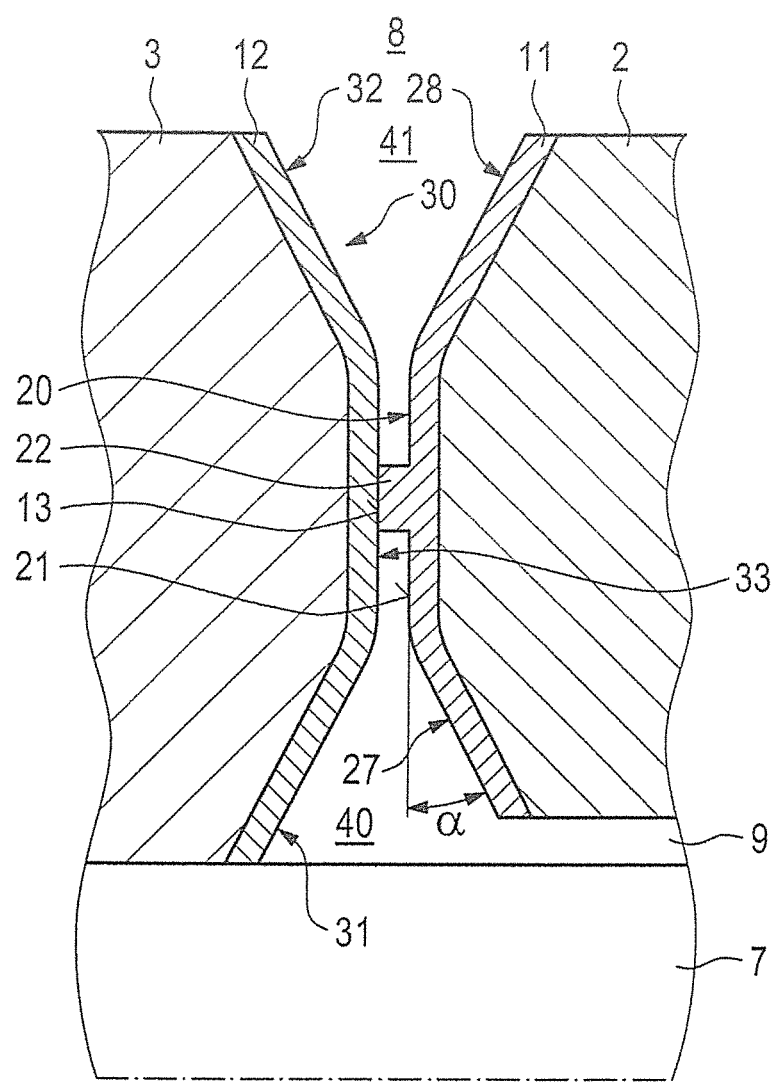

In the following, preferred exemplary embodiments of the invention are described in detail by referring to the accompanying drawing. In the drawing, identical or functionally identical parts are indicated by the same reference signs. In the drawing:

FIG. 1 shows a schematic sectional view of a mechanical seal arrangement according to a first exemplary embodiment of the invention, FIG. 2 shows a schematic enlarged partial sectional view of the mechanical seal arrangement of FIG. 1, FIG. 3 shows a schematic partial top view of a slide ring having a sealing edge, FIG. 4 shows a schematic sectional view of the slide ring of FIG. 3, FIG. 5 shows a schematic top view of the sealing ring of FIG. 3, FIG. 6 shows a schematic partial top view of a slide ring of a mechanical seal arrangement according to a second exemplary embodiment, FIG. 7 shows a schematic partial top view of a slide ring of a mechanical seal arrangement according to a third exemplary embodiment, FIG. 8 shows a schematic partial top view of a slide ring of a mechanical seal arrangement according to a fourth exemplary embodiment, FIG. 9 shows a schematic partial top view of a slide ring of a mechanical seal arrangement according to a fifth exemplary embodiment, FIG. 10 shows a schematic partial top view of a slide ring of a mechanical seal arrangement according to a sixth exemplary embodiment, FIG. 11 shows a schematic sectional view of FIG. 10, and FIG. 12 shows a schematic sectional view of a mechanical seal arrangement according to a seventh exemplary embodiment of the invention.

In the following, a mechanical seal arrangement 1 according to a first preferred exemplary embodiment of the invention is described in detail by referring to FIGS. 1 to 5.

As can be seen from FIG. 1, the mechanical seal arrangement 1 comprises a slide ring seal with a rotating slide ring 3 and a stationary slide ring 2. One of the two slide rings has a flat first sliding surface, and the other of the two slide rings has a second sliding surface with a circumferentially closed sealing edge 22. The slide ring seal provides sealing between a product side 8 and an atmosphere side 9.

As can in particular be seen in FIGS. 2, 3 and 4, the flat first sliding surface 30 is formed at the rotating slide ring 3. A second sliding surface 20 with the sealing edge 22 is formed at the stationary slide ring 2. As can be seen in FIG. 5, the sealing edge 22 is arranged centrally in the radial direction of the stationary slide ring 2. This means that a first distance A1 from the sealing edge 22 to the inner circumference of the stationary slide ring is equal to the second radial distance A2 from the sealing edge 22 to the outer circumference of the stationary slide ring 2.

As can be seen in FIGS. 3 and 4, the stationary slide ring 2 has a base area 21 and the sealing edge 22. Thus, the sealing edge 22 divides the base area 21 into a first partial base area 21a and a second partial base area 21b. At that, the surface areas of the first and the second partial base areas 21a, 21b are equal.

Alternatively, the ring widths of the first and the second partial base areas 21a, 21b are equal.

It is to be understood that the Figures show the sealing edge 22 on a strongly enlarged scale to make it easier to see the invention. In reality, the sealing edge 22 has a width B in a range of 10 to 500 µm and preferably has a width B that is smaller than or equal to 60 µm. This means that the sealing edge 22 has a width B (see FIGS. 3 and 4) that is smaller than an average width of a human hair, which is approximately 100 µm.

As shown in FIG. 4, the sealing edge 22 has a height H from the base area 21 that is in the range of 3 to 5 µm.

Compare to a total width B0 of the second sliding surface 20, the width B of the sealing edge 22 is less than 1% of the total width B0, preferably less than 0.6% of the total width B0 of the second sliding surface 20.

The first sliding surface 30 is formed to be flat (cf. FIG. 2) and preferably has a circular flatness of less than or equal to 0.5 µm. Further, the first sliding surface 30 of the rotating slide ring 3 has a medium roughness Ra of less than or equal to 0.02 µm, preferably less than or equal to 0.01 µm. The first sliding surface 30 is coated with a diamond coating 12.

The stationary slide ring 2 is fixated in a housing 5 and the rotating slide ring 3 is arranged at a shaft 7 by means of a driver 6 and rotates with the shaft 7.

Further, a pre-stressing element 4 is provided, which applies a pre-stressing force F to the rotating slide ring 3. In this way, a contact pressure between the sealing edge 22 and the first flat sliding surface 30 results between the stationary slide ring 2 and the rotating slide ring 3, which is preferably in a range of between $10 \times 10^5$ Pa and $1.000 \times 10^5$ Pa.

The first sliding surface 30 of the rotating slide ring 3 is preferably polished so as to have a medium roughness that is as low as possible.

Further, the sealing edge 22 is designed in such a manner that the ratio of the height H to the width B is in a range of 0.002 to 2.

A load factor (k factor) of the slide ring seal is in a range of 0 to 0.3. The load factor k is a dimensionless geometric parameter which determines a surface ratio of the slide ring seal and is defined as the ratio of the hydraulically loaded surface to the contact surface at the slide ring surfaces.

In this exemplary embodiment, the first sliding surface 30 as well as the second sliding surface 20 respectively have a diamond coating 11, 12. Here, the sealing edge 22 is made completely of diamond material. Alternatively, the first and the second sliding surface are made of cubic boron nitride, and also the sealing edge 22 is alternatively made completely of cubic boron nitride. Thus, the sealing edge 22 provides a contact surface 13 for the sliding action at the first sliding surface 30.

A thickness of the diamond coating 11, 12 on the slide rings is approximately 8 µm. The height H of the sealing edge 22 is thus smaller than the thickness of the coating on a substrate which defines the basis ring.

Further, a OH− ion donor 10 and/or a H+ ion donor 10 is provided between the contact surfaces of the slide rings. In this exemplary embodiment water is provided.

Thanks to the interaction of the measures according to the invention, namely the very narrow sealing edge 22 running on the flat first sliding surface 30 and the presence of a OH− ion donor and/or a H+ ion donor in the form of water as well as the pre-stressing force F, what results is a distance of approximately 3 Å between the sealing edge 22 and the first sliding surface 30. Here, the OH− ion or the H+ ion attach at free bonding sites of the diamond coatings, so that the slide ring seal runs on an ion cushion. In this manner, a most minimal friction coefficient of less than 0.003 can be achieved, so that practically a wear-free operation of the slide ring seal is possible. Thus, a balance is established during operation, wherein a minimal leakage passes the minimum gap of less than or equal to 3 Å. Due to the low friction coefficient, there is also a negligibly low frictional heat, so that also no measures with regard to a necessary cooling of the slide rings are necessary. Due to the minimal leakage, there is no necessity for closed seal systems, i.e. also no supply appliance for supplying the slide ring seal with a lubricant or the like is necessary. In this manner, significant savings with respect to investments in slide ring seal systems can be facilitated.

Thus, according to the invention, for the first time there is a solution which provides a practically leakage-free mechanical seal arrangement, or where at most a barely noticeable leakage in the atomic range occurs.

FIG. 6 shows a mechanical seal arrangement according to a second exemplary embodiment of the invention. As can be seen in FIG. 6, the sealing edge 22 in this exemplary embodiment is not circular as in the first exemplary embodiment, but has a crenellation-shaped form. Here, this results in first pockets 23 that are oriented outwards in the radial direction and second pockets 24 that are directed inwards in the radial direction. As can be seen in FIG. 6, the first and second pockets are provided to have different sizes. The first pockets 23 are larger than the second pockets 24. Here, the first pockets 23 have a first length U1 in the circumferential direction that is twice the second length U2 of the second pockets 24 in the circumferential direction. Here, the length of the pockets in the circumferential direction is measured respectively at the base of the pockets. The effect of the first and second pockets 23, 24 at the sealing edge 22 is that in contrast to a circular embodiment, the provision of OH− ion and/or H+ ion at the sliding surfaces is improved. Thus, the OH− ion donor and/or the H+ ion donor can be stored directly adjacent to the sealing edge 22. Further, through the crenellation-shaped form of the sealing edge 22, a total length of the sealing edge becomes longer as compared to a circular blade. Otherwise, the same advantages as in the first exemplary embodiment are obtained.

FIG. 7 shows a mechanical seal arrangement according to a third exemplary embodiment of the present invention. In the third exemplary embodiment, the sealing edge 22 is provided in such a manner that the sealing edge 22 has a sinusoidal geometric shape. In this manner, also first and second pockets 23, 24 are created at the sealing edge 22. Also in this way, a longer sealing length is achieved as compared to a circular sealing edge. The pockets have the same function as in the second exemplary embodiment.

FIG. 8 shows a mechanical seal arrangement according to a fourth exemplary embodiment of the present invention. In the fourth exemplary embodiment, the sealing edge 22 has an evenly varying width. As can be seen in FIG. 8, the narrowest width of the sealing edge 22 is indicated by the reference sign B1, and the respectively widest position of the sealing edge 22 is indicated by the reference sign B2. Here, the small width B1 corresponds to half the larger width B2. At that, the varying width is provided to be even. For example, this sealing edge 22 can be created by two sinus curves that are offset by 180° with respect to each other and form the walls of the sealing edge 22.

FIG. 9 shows a mechanical seal arrangement with a stationary slide ring 2 according to a fifth exemplary embodiment of the invention. As in the first exemplary embodiment, the stationary slide ring 2 has a circular sealing edge 22. Further, support structures 25 are additionally provided at the first and second base area 21a, 21b. In this exemplary embodiment, the support structures 25 have a rectangular basic shape, and further have a height that equals the height of the sealing edge 22. During operation, the support structures ensure that a radial tilting of the slide rings is prevented. In this way, a sealing gap in the range of 3 Å can be ensured during operation. The support structures 25 are provided from the same material as the coating of the stationary slide ring 2, preferably from diamond material. In this exemplary embodiment, the support structures 25 are respectively provided individually on the base area 21. Alternatively, the support structures can also be connected with a sealing disc 22.

FIGS. 10 and 11 shows a mechanical seal arrangement with a stationary slide ring 2 according to a sixth exemplary embodiment of the invention. As can be seen in FIG. 10, the stationary slide ring 2 has a first sealing edge 22 and a second sealing edge 26. The two sealing edges 22, 26 are respectively circular provided. Here, the first sealing edge 22 has a greater height H1 than the height H2 of the second sealing edge 26 (see FIG. 11). Thus, the second sealing edge 26 serves as a reserve sealing edge, if the first sealing edge 22 is damaged. As can further be seen from FIG. 11, a first width B11 of the first sealing edge 22 is equal to a second width B12 of the second sealing edge 26. The sealing edges 22, 26 are preferably provided to be symmetrical at the stationary slide ring 2.

FIG. 12 shows a mechanical seal arrangement according to a seventh exemplary embodiment of the invention. In contrast to the previous exemplary embodiments, the sliding surfaces of the stationary slide ring 2 of the rotating slide ring 3 have respectively three areas. More precisely, the stationary slide ring 2 has a first tapering area 27 and a second tapering area 28. A flat base area 21 is provided between the two tapering areas 27, 28, having the sealing edge 22 (cf. FIG. 12). Here, the two tapering areas 27, 28 taper off starting from the base area 21.

The first sliding surface 30 of the rotating slide ring 3 is constructed in the same manner as the sliding surface of the stationary slide ring 2. More precisely, the first sliding surface 30 has a first tapering area 31, a second tapering area 32 and a flat area 33 arranged between the two tapering areas 31, 32. As can be seen in FIG. 12, what thus results is an inner space 40 at the inner circumference of the slide rings and an outer space 41 at the outer circumference of the slide rings.

In this exemplary embodiment, the tapering areas are formed in a conical manner. Here, an angle α of the conically tapering areas is chosen to be respectively the same. This results in the inner and outer spaces 40, 41 having the same size. The provision of the inner and outer spaces 40, 41 results in a significantly reduced to the friction of the fluids present in these areas which is based on shearing. In this manner, losses are significantly reduced.

The sealing edge 22 is arranged in the center of the flat base areas 21 at the second sliding surface 20. Here, the two tapering areas 27, 28 and the flat base area 21 at the first slide ring 2 have approximately the same width in the radial direction. In the same manner, the widths of the first and second tapering areas 31, 32 and of the flat area 33 at the rotating slide ring 3 are provided with respectively a third of the total width. Thus, in the seventh exemplary embodiment, a surface at the slide rings, that are positioned directly opposite each other can be reduced. Thus, through the sealing edge 22 it is possible to reduce a size of the surfaces that are positioned directly opposite each other and thus to reduce losses during operation.

As for all described exemplary embodiments, it should be mentioned that the sealing edges 22 are respectively provided at the stationary slide ring 2 and the rotating slide ring 3 has a flat first sliding surface 30. However, according to the invention, it is also possible that the sealing edges are provided at the first sliding surface 30 of the rotating slide rings 3 and the second sliding surface 20 of the stationary slide rings 2 is formed as a flat surface. In other words, the invention works independently of which the sliding surfaces of the slide rings has the sealing edge 22 and which of the sliding surfaces is the flat sliding surface.

In addition to the above written description of the invention for a supplemental disclosure it is explicitly referred to the graphic representation of the invention in FIGS. 1 to 12.

LIST OF REFERENCE SIGNS 1 mechanical seal arrangement
2 stationary slide ring
3 rotating rotating slide ring
4 pre-stressing element
5 housing
6 driver
7 shaft
8 product side
9 atmosphere side
10 OH− ion donor and/or H+ ion donor
11 diamond coating at the stationary slide ring
12 diamond coating at the rotating slide ring
13 contact surface at the sealing edge
20 second sliding surface
21 base area
21a first partial base area
21b second partial base area
22 sealing edge
23 first pocket
24 second pocket
25 support structure
26 second sealing edge 27 first tapering area
28 second tapering area
30 first sliding surface
31 first tapering area
32 second tapering area
33 flat area
40 inner space
41 outer space
α angle of the tapering area
A1 first distance
A2 second distance
B width of the sealing edge
B0 total width of the second sliding surface
B1 minimum width
B2 maximum width
B11 width of the first sealing edge
B12 width of the second sealing edge
F pre-stressing force
H height of the sealing edge
H1 height of the first sealing edge
H2 height of the second sealing edge
U1 first length
U2 second length

The invention claimed is:

1. Mechanical seal arrangement, comprising:
   a mechanical seal with a rotating slide ring and a stationary slide ring,
   wherein one of the two slide rings has a first sliding surface,
   wherein the other of the two slide rings has a second sliding surface with a circumferentially closed sealing edge, which projects from in a direction towards the first sliding surface by a height (H),
   wherein the sealing edge has a width which is in an area between 10 to 500 μm,
   wherein at least one pre-stressing element pre-stresses the slide rings against each other,
   wherein the second sliding surface and the sealing edge at the second sliding surface have a diamond coating, or wherein the second sliding surface and the sealing edge at the second sliding surface have a cubic boron nitride coating, wherein a width of the sealing edge is smaller than a width of the first sliding surface, and contacts only a portion of the first sliding surface, and
   wherein between the first sliding surface and the second sliding surface a OH ion donor and/or a H+ ion donor is present.

2. Mechanical seal arrangement according to claim 1, wherein the sealing edge is made completely of diamond or wherein the sealing edge is made completely of cubic boron nitride.

3. Mechanical seal arrangement according to claim 1, wherein the width (B) of the sealing edge is smaller than or equal to 60 μm and/or the height (H) of the sealing edge is smaller than or equal to 5 μm.

4. Mechanical seal arrangement according to claim 1, wherein the first sliding surface has a medium roughness of smaller than or equal to 0.02 μm.

5. Mechanical seal arrangement according to claim 1, wherein a load factor (k) of the slide ring seal is in a range of between 0 to 0.3.

6. Mechanical seal arrangement according to claim 1, wherein the first sliding surface has a circular flatness of smaller than or equal to 5 μm, in particular smaller than or equal to 0.5 μm.

7. Mechanical seal arrangement according to claim 1, wherein the sealing edge is circular.

8. Mechanical seal arrangement according to claim 1, wherein the sealing edge is wave-shaped, in particular sine-shaped.

9. Mechanical seal arrangement according to claim 1, wherein the sealing edge is crenellation-shaped or meander-shaped.

10. Mechanical seal arrangement according to claim 9, wherein die crenellation-shaped or meander-shaped sealing edge has first pockets at a radially outwardly directed side and has second pockets at a radially inwardly directed side, wherein a circumferential length of the first pockets differs from a circumferential length of the second pockets.

11. Mechanical seal arrangement according to claim 1, wherein the sealing edge has a varying width (B1, B2).

12. Mechanical seal arrangement according to claim 1, wherein the sealing edge has a ratio of the height (H) to the width (B) in a range of 0.002 to 2.

13. Mechanical seal arrangement according to claim 1, wherein the second sliding surface has support structures at the base area.

14. Mechanical seal arrangement according to claim 1, further comprising a second sealing edge at the second sliding surface.

15. Mechanical seal arrangement according to claim 13, wherein the second sealing edge has a second height (H2) that is smaller than a first height (H1) of the first sealing edge.

16. Mechanical seal arrangement according to claim 1, wherein the OH ion donor and/or the H+ ion donor is a liquid or a gas or a gas-liquid s mixture.

17. Mechanical seal arrangement according to claim 15, wherein the OH ion donor and/or the H+ ion donor is water or has a content of water or is water vapor or has a content of water vapor.

18. Mechanical seal arrangement according to claim 1, wherein the second sliding surface has a first tapering area, a second tapering area and has a flat area, wherein the flat area is arranged between the first and second tapering area, and wherein the sealing edge is arranged at the flat area.

19. Mechanical seal arrangement according to claim 18, wherein a width of the first and second tapering area in the radial direction is equal to a width of the flat area and/or wherein the first sliding surface has a first tapering area, a second tapering area and a flat area that is arranged between the two tapering areas.

* * * * *